E. C. SCRUGGS.
WRENCH.
APPLICATION FILED APR. 30, 1908.
916,613.
Patented Mar. 30, 1909.
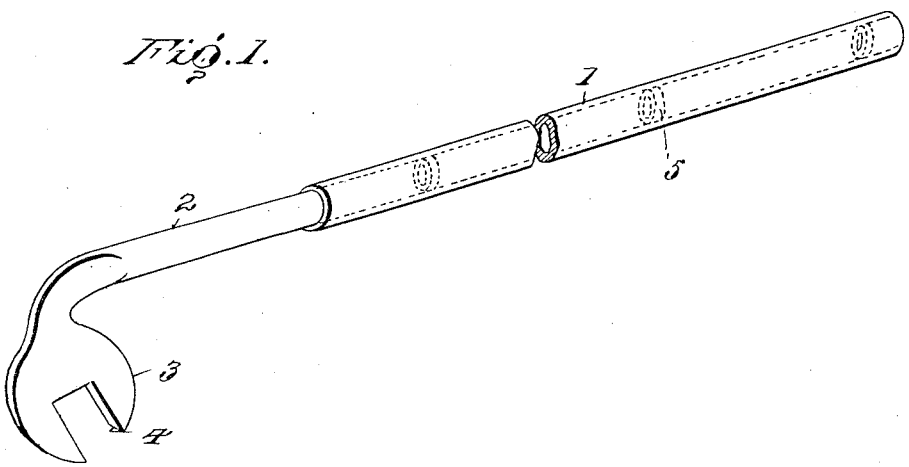
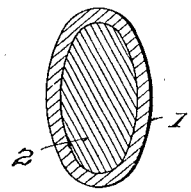 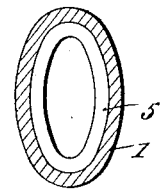
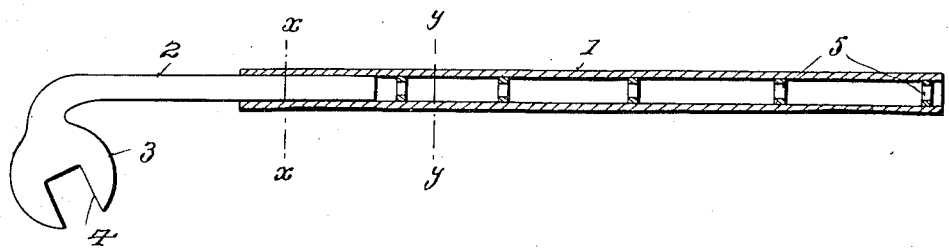
Witnesses
Inventor
E. C. Scruggs
By
Attorneys

UNITED STATES PATENT OFFICE.

EDWARD C. SCRUGGS, OF NASHVILLE, TENNESSEE.

WRENCH.

No. 916,613.

Specification of Letters Patent.

Patented March 30, 1909.

Application filed April 30, 1908. Serial No. 430,169.

*To all whom it may concern:*

Be it known that I, EDWARD C. SCRUGGS, citizen of the United States, residing at Nashville, in the county of Davidson and State of Tennessee, have invented certain new and useful Improvements in Wrenches, of which the following is a specification.

The present invention has for its object to devise a tool of the long-handled rigid-jaw variety, being particularly adapted for various kinds of work requiring the use of a long-handled wrench.

The invention further has for its object to provide a wrench of the character set forth that will be light, simple, durable, and strong, and which will embody a hollow handle braced so as to withstand strain.

The invention further consists of the novel features and details of construction which will hereinafter be set forth, illustrated, and claimed.

Referring to the drawings forming a part of the specification:—Figure 1 is a perspective view of the tool embodying the invention, part of the handle being broken away. Fig. 2 is a side view of the tool, the handle being in section. Fig. 3 is a cross section on the line *y—y* of Fig. 2, showing parts on a larger scale. Fig. 4 is a cross section on the line *x—x* of Fig. 2, showing parts on the same scale as Fig. 3.

Corresponding and like parts are referred to in the following description and indicated in all the views of the drawings by the same reference characters.

The tool comprises a handle 1 and shank 2 provided with a head 3.

The shank 2 is solid and may be of any length and the head 3 may be of any form, being preferably of circular outline and having an opening 4 in an edge designed to receive the nut or other work to be turned. The shank is oblong or oval in cross section, the major axis being in a plane passed through the head 3, thereby adapting the tool to stand strain when in operation.

The handle may be of any length preferably three times the length of the shank and is secured to the shank in any suitable way and is hollow for the sake of lightness. Reinforcements 5 are spaced at intervals in the length of the handle and strengthen and brace the same, consisting of links inserted within the handle and held in place in any manner. The reinforcements are unequally spaced, being closer together toward the inner end of the handle because of the strain to be resisted when the tool is in operation.

From the foregoing it will be understood that I provide a tool which while simple and light in construction, is at the same time durable and capable of withstanding strain when in active operation.

Having thus described the invention, what is claimed as new is:

The herein-described tool comprising a shank 2 provided at one end with a flat head 3 adapted to engage the member to be turned, a hollow handle 1 of substantially uniform diameter throughout its length and arranged at one end for the reception of the shank, the shank and the handle being oval in cross section and having the major axis disposed in a plane parallel to the plane passing through the head, and a series of longitudinally spaced annular reinforcements 5 also of oval form and mounted within the hollow handle, as and for the purpose specified.

In testimony whereof I affix my signature in presence of two witnesses.

EDWARD C. × SCRUGGS. [L. S.]
his mark

Witnesses to his signature by mark:
W. B. BALLARD,
C. BAILEY BELL.